United States Patent [19]

Musil

[11] Patent Number: 4,801,218
[45] Date of Patent: Jan. 31, 1989

[54] THREE-POINT SUSPENSION FOR BITUMINOUS PAVERS

[75] Inventor: Joseph E. Musil, Ely, Iowa

[73] Assignee: Cedarapids, Inc., Cedar Rapids, Iowa

[21] Appl. No.: 4,875

[22] Filed: Jan. 20, 1987

[51] Int. Cl.⁴ ............................................. E01C 19/22
[52] U.S. Cl. ....................................... 404/84; 404/101
[58] Field of Search ................... 404/83, 84, 101, 105, 404/108; 280/6.11, 6 H

[56] References Cited

U.S. PATENT DOCUMENTS

| | | | |
|---|---|---|---|
| 2,443,147 | 6/1948 | Ritchie | 180/20 |
| 2,491,275 | 12/1949 | Millikin | 404/84 |
| 3,054,334 | 9/1962 | Barber et al. | 404/108 |
| 3,584,547 | 6/1971 | Davis | 404/83 |
| 3,605,580 | 9/1971 | Miller | 280/6 H X |
| 3,606,827 | 9/1971 | Miller et al. | 404/84 |
| 3,779,661 | 12/1973 | Godberson | 404/84 X |
| 3,890,055 | 6/1975 | Rochfort | 404/84 |
| 3,899,037 | 8/1975 | Yuker | 180/6.48 |
| 3,901,616 | 8/1975 | Greening | 404/102 |
| 4,018,296 | 4/1977 | Knudson | 180/41 |
| 4,231,678 | 11/1980 | Carternock | 404/103 |
| 4,279,319 | 7/1981 | Joyce, Jr. | 180/12 |
| 4,340,235 | 7/1982 | Thompson | 280/6 H |
| 4,345,852 | 8/1982 | Goto et al. | 404/114 |
| 4,382,604 | 5/1983 | Nakagawa | 280/6.11 X |
| 4,384,806 | 5/1983 | Taylor, Jr. | 404/98 |
| 4,568,095 | 2/1986 | Bogner et al. | 280/6 H |

FOREIGN PATENT DOCUMENTS 7700902-5  5/1978  Sweden .

Primary Examiner—Jerome W. Massie, IV
Assistant Examiner—Matthew Smith
Attorney, Agent, or Firm—Simmons, Perrine, Albright & Ellwood

[57] ABSTRACT

An improved "3-point" suspension for a bituminous paver disposes two of the suspension "points" at the front of the tractor unit and the third "point" at the rear. Preferably the third suspension "point" is achieved by suspending the rear of the tractor unit via laterally spaced hydraulic cylinders interconnected such that upward or downward movement of one rear wheel or track results in corresponding downward or upward movement of the other rear wheel or track. The hydraulic suspension also allows the height of the rear of the tractor unit, and thus the height of the spreader screws relative to the ground, to be adjusted on the run by conjoint upward or downward movement of both rear wheels or tracks.

30 Claims, 5 Drawing Sheets

THREE-POINT SUSPENSION FOR BITUMINOUS PAVERS

BACKGROUND OF THE INVENTION

Bituminous paving machines, especially those for asphaltic paving of roadways and the like, consist of a tractor unit and a screed assembly. The latter is usually of the "floating" kind and is drawn by a pair of laterally spaced screed or pull arms pivoted to the sides of the tractor. The tractor itself is of the crawler-type or of the rubber-tired wheel-type, the drive sprockets of the former and the drive wheels of the latter being at the rear of the tractor. Both types are currently suspended in one of two fashions.

The first incorporates in effect a rigid rectangular body to whose four corners all the sprockets or all the wheels, as the case may be, are journaled in such manner that vertical travel of a track or a wheel owing to uneven terrain results in vertical movement of the tractor body. This is the least desirable of the two kinds of suspension because lifting of a forward corner of the body also lifts its corresponding rear corner and thus impairs traction. In the wheel-type lifting of a rear corner of the body also lifts the corresponding forward corner and impairs steering which is accomplished by the forward wheels. Since automatic grade and slope controls are mounted in effect upon the body, vertical movement of the latter impairs the quality of the mat laid by the machine. The best that can be said for this type of suspension is that it is relatively cheap and easy to design.

The other kind of suspension is the so-called "3-point" type and an example of this is shown in U.S. Pat. No. 3,453,939. From FIGS. 1, 6, 7 and 8 of that patent it will be seen that the stub axles 53 of the rear drive wheels 54 are fixed to the rear of the tractor body. Journaled about the axles 53, however, are the rear ends of a pair of side plates 60 which extend forwardly to the front of the tractor and on which the steered wheels 66 are journaled. The forward ends of the side plates 60 are journaled at 62 in turn to the ends of a "walking" crossbeam 63 which is centrally journaled at 64 to the tractor body. Hence the tractor body is suspended in effect at the three points 53 and 64 so that the front wheels 66 can move vertically without disturbing the rear drive wheels 54 and so affecting traction. Lifting of a rear wheel in turn does not affect steering, a more stable platform for automatic grade and slope controls is provided, and stress on the tractor body is reduced. In a crawler version the forward idler sprockets and the track bogies are all attached to the side plates 60. The "3-point" type of suspension is obviously superior to the other but it is more costly and more difficult to design properly.

Despite its manifest advantages the "3-point" type just described has some inherent disadvantages. For instance, and referring to FIGS. 2, 10 and 11 of the above patent, if the hopper 10 is unevenly loaded, say there is more material on the hopper dump 13 than on the other dump 13' (not an infrequent occurrence), weight will be lifted from the diagonally opposite rear drive wheel 54 and thus its traction impaired. The same result ensues in the case of the crawler version because weight will be lifted from the rear portion of the diagonally opposite track. Furthermore, the hopper dumps 13 and 13, when open must be at a sufficient elevation above the front wheels 66 (or the forward tracks in the crawler version) in order to accommodate vertical travel of the forward ends of the side plates 60, thus either decreasing the capacity of the overall hopper 10, in the crawler version, or, in the wheeled version, limiting the diameter of the wheels 66 which in turn diminishes their steering ability.

So the primary object of the present invention is an improved suspension of the "3-point" type for the tractor unit of a bituminous paver, whether of crawler or wheel-type, a suspension which not only eliminates the foregoing disadvantages of the conventional "3-point" type but also contributes several additional and significant advantages not, so far as is known, found in past or current bituminous pavers.

SUMMARY OF THE INVENTION

The invention in effect turns the current "3-point" type suspension of bituminous pavers end-to-end, that is to say, the central point is placed at the rear of the tractor and the other two at the front. Preferably the rear point is also in effect made vertically adjustable so that the height of the rear of the tractor can be selectively adjusted on the run by the operator. The result is that no longer will unequal loads on the sides of the hopper tend to lift a rear drive wheel (or rear track) and reduce traction. The hopper dumps can be located lower and the overall capacity of the hopper thus increased in the crawler version since it is no longer necessary to accommodate vertical travel of the forward tracks. Alternately, in the wheeled version the front wheels can be of larger diameter to improve steering ability. And in both versions a more stable platform is provided for automatic grade and slope controls.

Several additional advantages also follow. First and foremost, the ability to adjust the height of the rear of the tractor while on the run allows the height of the augers above the roadway to be varied while paving. This is an important feature because the augers can thus be kept at optimum height at all times to accommodate variations in mix. For instance, when laying a mix including large, say, two-inch aggregate, if the augers are too low, it becomes difficult to spread the mix evenly and segregation occurs, particularly in the area between the inner ends of the left and right augers where their drive components are located, which leaves a streak of "coarse" mix lacking in "fines" down the mat. If, on the other hand, the augers are too high not only is there more material than necessary before the screed, and thus more tractive effort needed to pull the latter, but segregation as well as cooling of the material can also occur because the auger supports or hangers may interfere with lateral movement of the material. All this is well-known in the art and some pavers permit the augers to be attached at different vertical locations at the rear of the tractor in an effort to confront the problem. But that is at best a hit-or-miss approach because only on the run can the optimum height of the augers be accurately determined for a particular mix. This can be readily accomplished with the improved "3-point" suspension since the rear of the tractor and thus the augers can be raised or lowered as the mat is being laid until auger height is not so low as to cause segregation but not so high as to unnecessarily increase tractive effort and perhaps also segregation and cooling of the mix.

Another advantage ensues, particularly in the case of rubber tired pavers when the latter are being loaded on or being unloaded from the flat bed of trucks used for transporting the pavers to and from paving sites. When a paver is being loaded the screed assembly is first raised from the ground by winches or the like at the rear of the tractor, thus putting the entire weight of the screed assembly upon the rear tires and so compressing them further. This of course lowers the augers at the same time, perhaps one to two inches, so that when the paver is driven up the loading ramp onto the truck the augers often strike the ground and are damaged. The same can happen when the paver is later unloaded. The danger is not as acute in the case of crawler-type tractors but can occur especially if the incline of the loading ramp is severe. With the improved "3-point" suspension, after the screed assembly is elevated, the rear of the tractor can be raised to restore or even increase the clearance between the augers and the ground and so avoid the chance of damage.

The improved "3-point" suspension can be accomplished mechanically but it is preferably done hydraulically. Each rear drive wheel (or each rear drive sprocket in a crawler version) is carried by upper and lower piston rods extending from the upper and lower ends of a pair of vertically disposed hydraulic cylinders attached in turn to the tractor body. The chambers above the pistons on both sides of the tractor are hydraulically interconnected as are the chambers below the pistons on both sides of the tractor so that when one wheel rises the other lowers by the same amount, providing in effect a single "point" of suspension centrally between the wheels at the rear of the tractor. The interconnecting hydraulic lines are also connected into a variable displacement pump through a three-position directional valve so that fluid can be conjointly shuttled back and forth between the upper and lower chambers of the cylinders on both sides and hence conjointly raise or lower the wheels (or the tracks) in order to adjust the height of the rear of the tractor. The drive for the rear wheels (or the drive sprockets) is also preferably hydraulic and takes the form of an integrated hydraulic motor, gear box and brake assembly incorporated into each wheel (or sprocket) hub.

Other features and advantages of the invention will become apparent from a preferred form shown in the drawings and hereafter described in more detail.

DETAILED DESCRIPTION OF A PREFERRED EMBODIMENT

Figure 1:
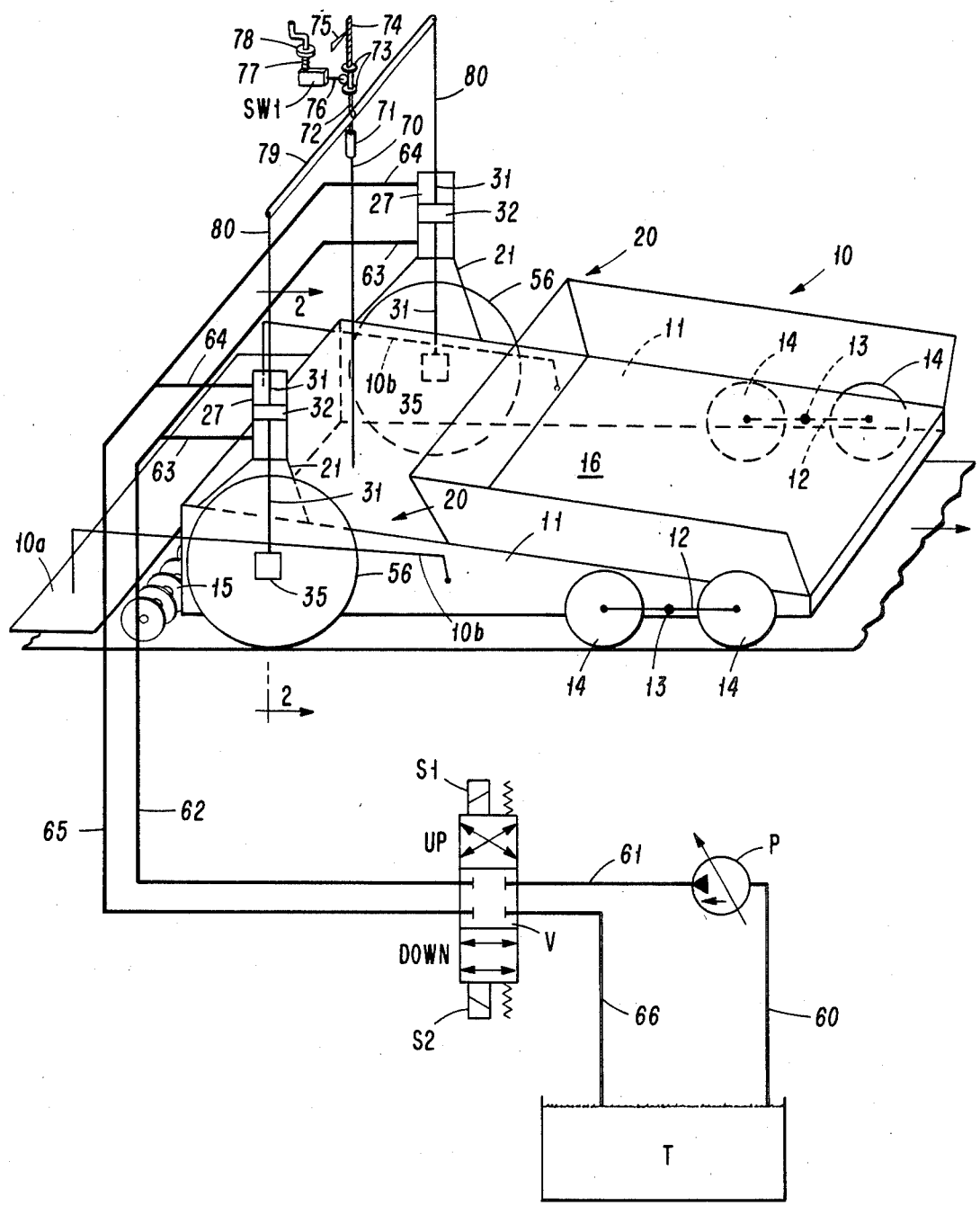
FIG. 1 is a diagrammatic view of the invention incorporated into the tractor unit of a rubber-tired, wheel-type bituminous paver.

Turning first to FIG. 1 the paver's tractor unit includes a rigid body, generally indicated at 10, having side plates 11 to which a floating screed assembly indicated at 10a is pivoted in conventional manner as indicated at 10b. A pair of bogies 12 are pivoted at 13 adjacent the forward end of the side plates 11, each bogie 12 mounting a pair of dirigible wheels 14, and to the rear end of the body 10 is mounted a pair of spreader screws 15 (only the right-hand one being shown). The tractor unit, it will be understood, also includes other typical components such as a hopper indicated at 16, hopper dumps above the wheels 14, slat conveyors, and hydraulic pumps, drives and controls since the paver is preferably of the all-hydraulic type. All these aspects of the paver are well-known in the art and need not be further described.

Figure 5:
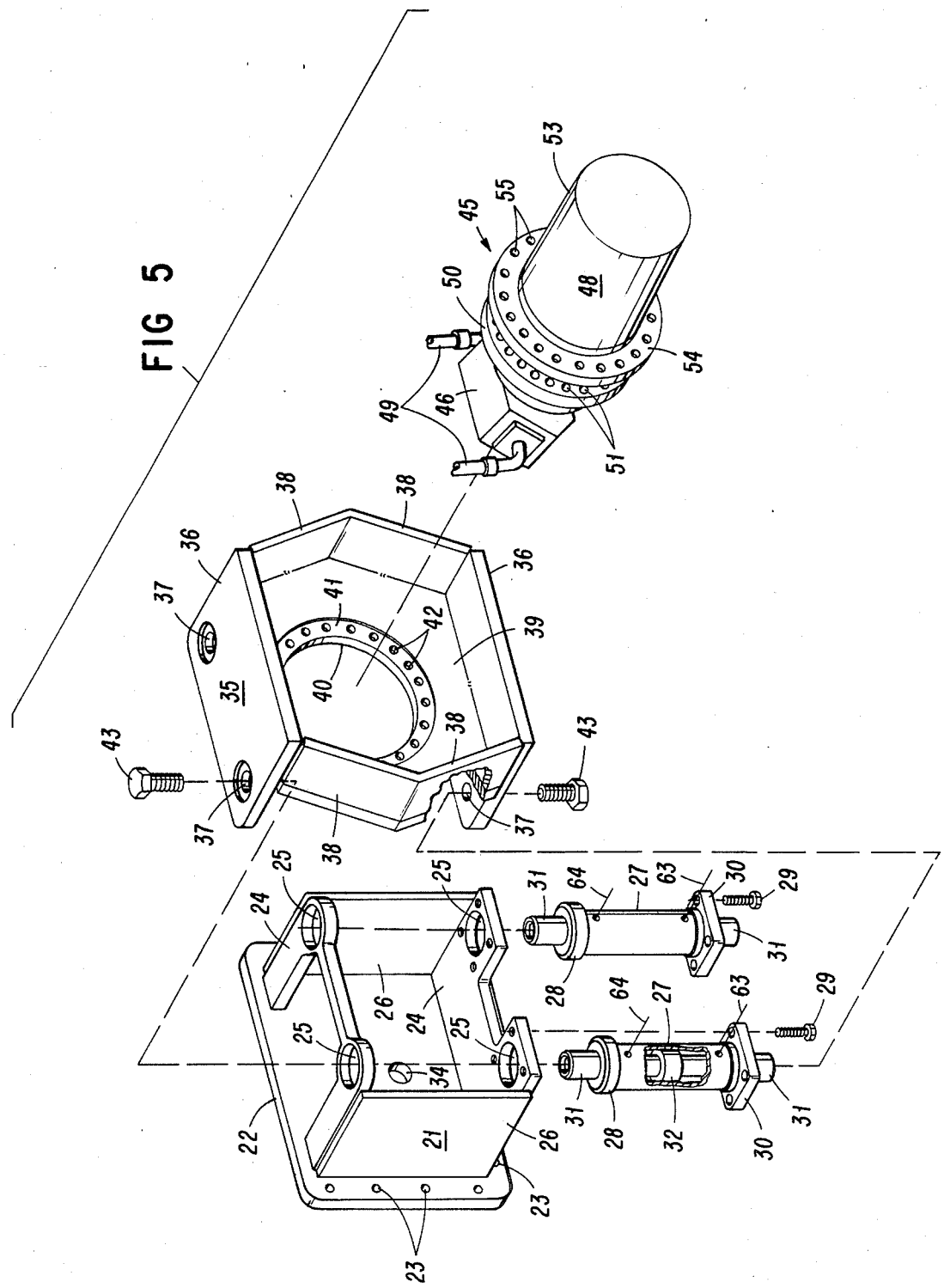
FIG. 5 is an exploded view of the components of FIGS. 2-4.

Adjacent the rear ends of the side plates 11 are disposed a pair of rear suspension assemblies, generally indicated at 20, which drive the tractor unit and thus the paver and are illustrated in detail in FIGS. 2-5. Since both suspension assemblies 20 are identical, the right-hand one only will be described. Each assembly 20 includes a large, welded-up mounting bracket 21 having a inner vertical end plate 22 provided with bolt holes 23 along its side and bottom edges (see FIG. 5). From the end plate 22 a pair of horizontal upper and lower support plates 24 extend laterally outwardly, being configured as best shown in FIG. 5, and provided at their outer ends with two pairs of laterally spaced, vertically aligned bores 25, the plates 24 being tied together by a pair of intervening vertical gusset plates 26 to form the bracket 21. A pair of hydraulic cylinders 27 are inserted up through the bores 25, being located in the upper bores 25 by sleeves 28 and secured to the lower plate 24 by bolts 29 up through flanges 30 fixed to the lower ends of the cylinders 27. The latter have double piston rods 31 extending from intermediate pistons 32, the ends of the piston rods 31 being bored and internally threaded. Each bracket 21 is bolted at 33 to its respective side plate 11, a shear pin being also welded thereto and located in a central bore 34 in the end plate 22.

Figure 2:
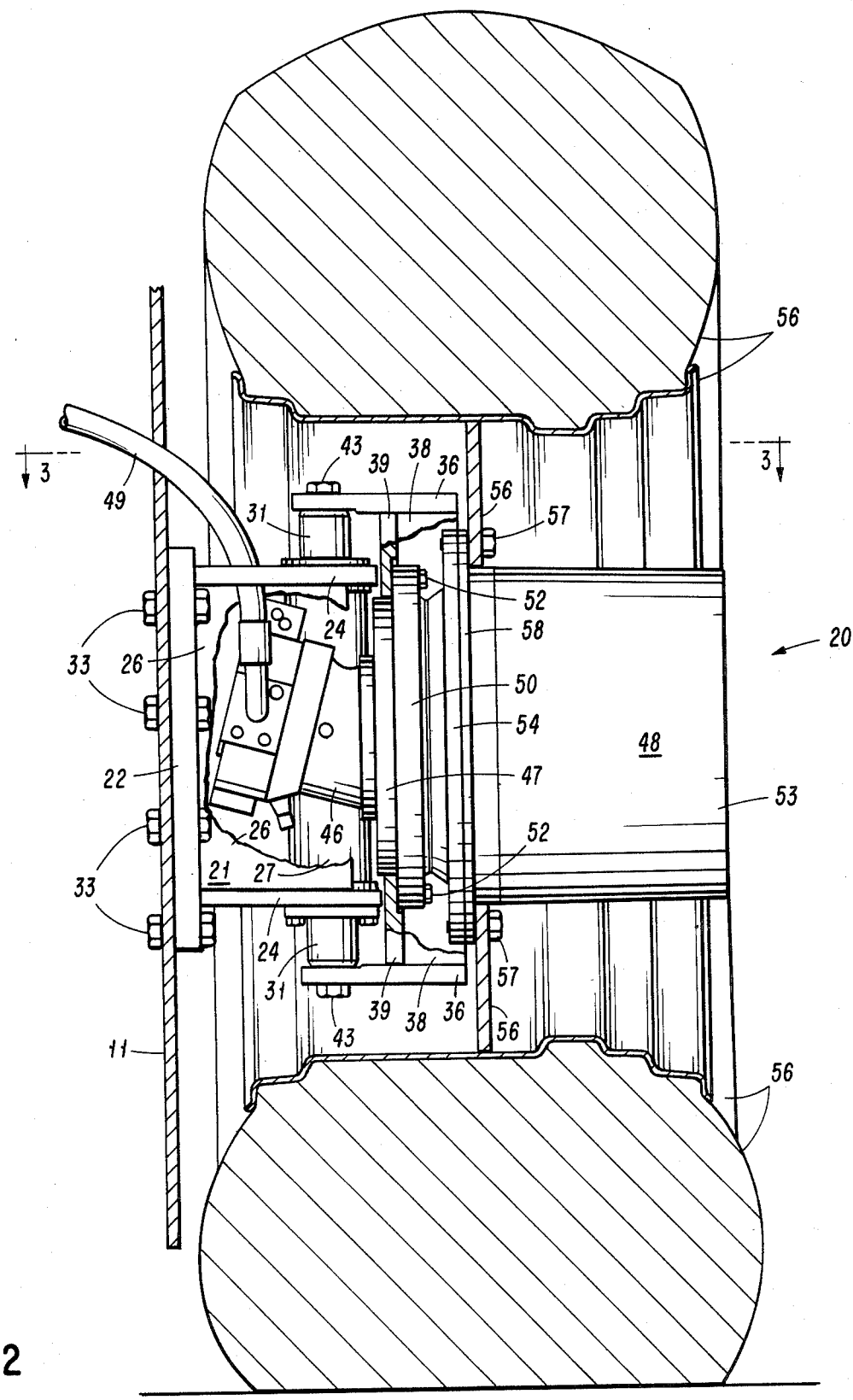
FIG. 2 is a sectional view taken along the line 2—2 of FIG. 1 illustrating the actual physical structure of one of the two rear suspension assemblies of the tractor unit.
Figure 3:
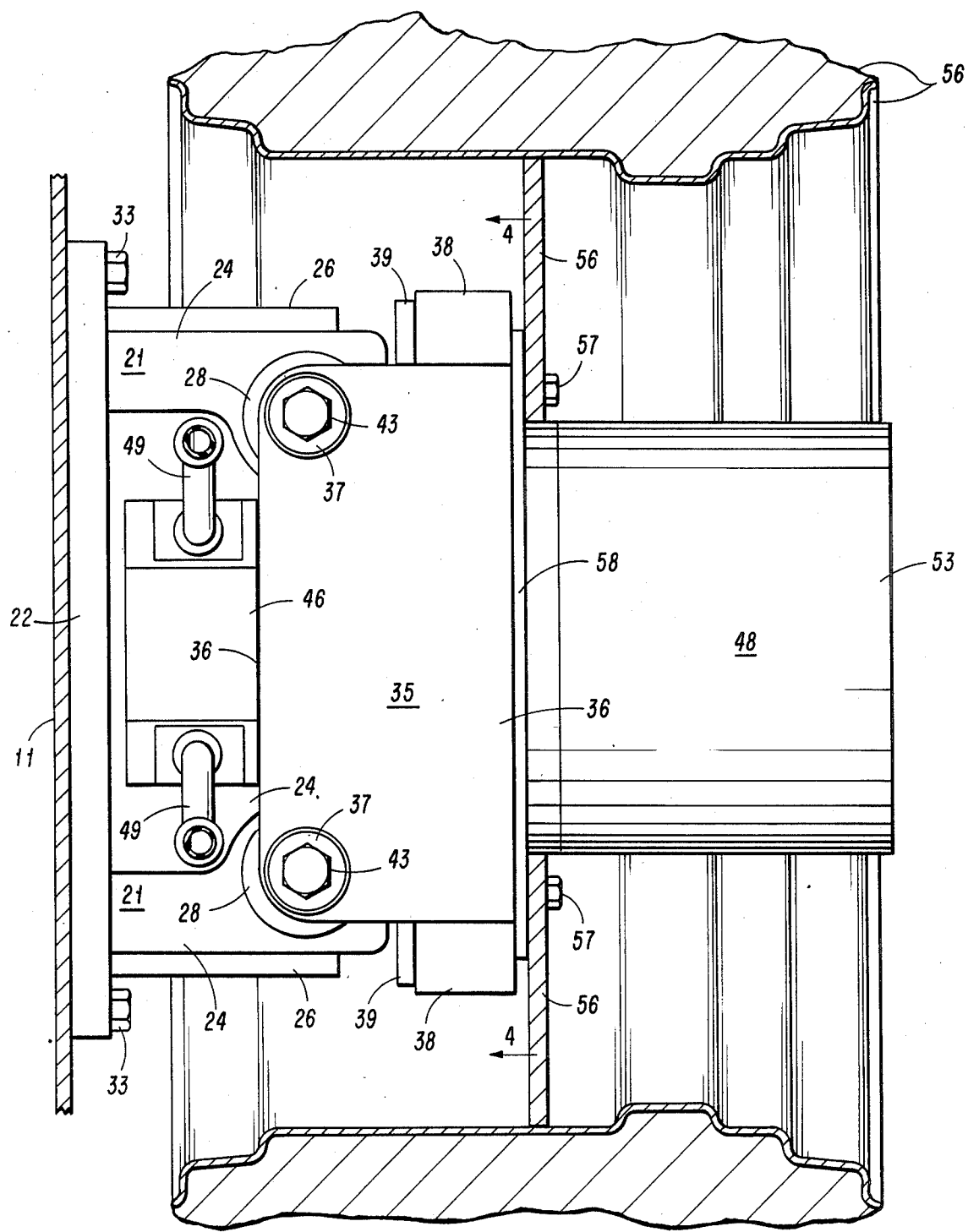
FIG. 3 is a sectional view taken along the line 3—3 of FIG. 2.
Figure 4:
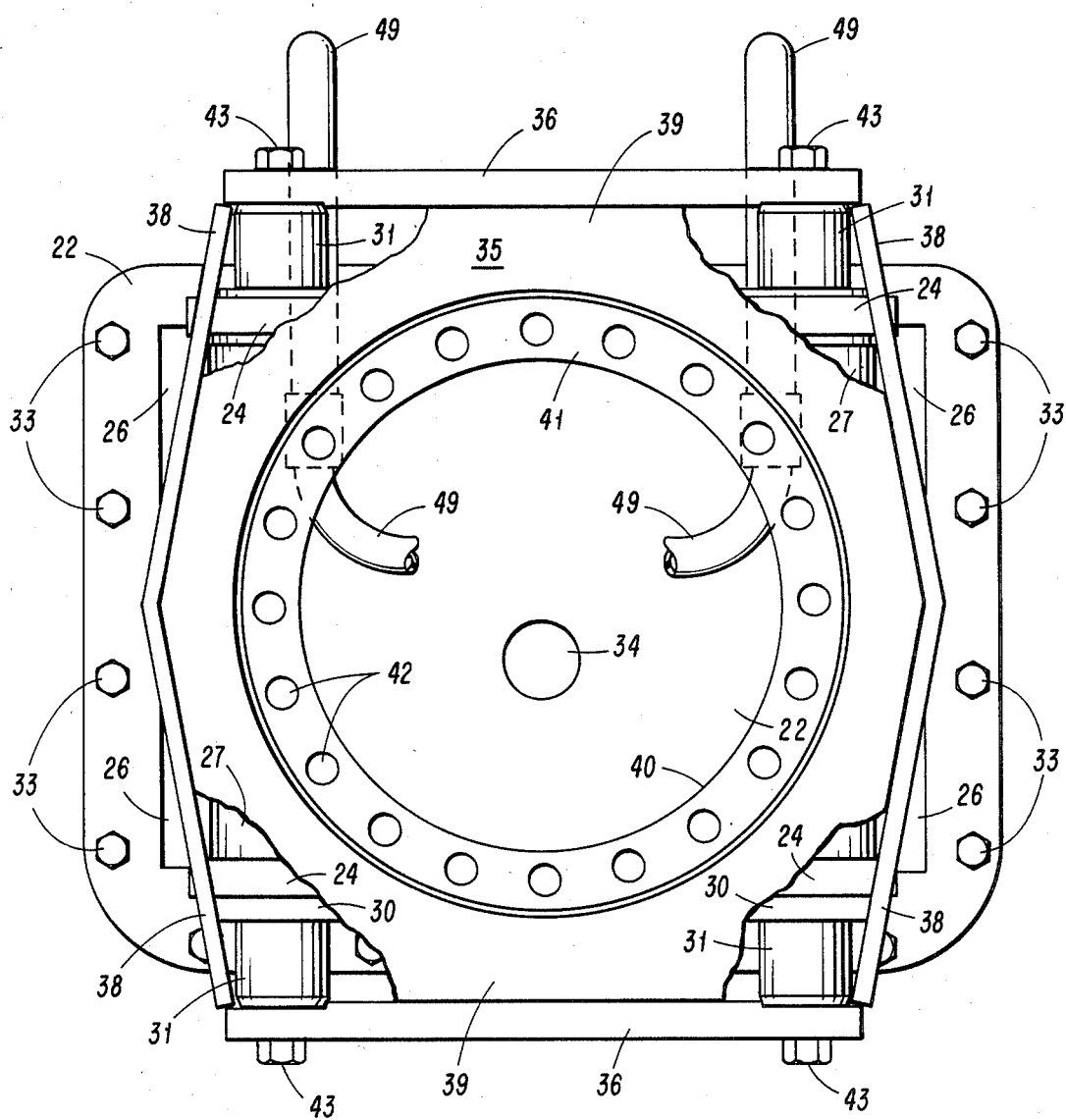
FIG. 4 is a sectional view taken along the line 4—4 of FIG. 3 but with the integrated drive assembly and wheel omitted.

Over the piston rods 31 is slipped a large, welded-up drive support bracket, generally indicated at 35, having a pair of horizontal upper and lower plates 36 embracing the ends of the piston rods 31 and bored and counterbored as indicated at 37 (see FIG. 5). The plates 36 are joined by two pairs of angled plates 38 and the whole gusseted by an intermediate cross plate 39. The latter plate is circularly apertured at 40, shouldered at 41, and provided with a round of mounting holes 42. The bracket 35 is secured to the piston rods 31 by bolts 43 and in turn mounts an integrated drive assembly, generally indicated at 45. The latter is a "Compact Wheel Drive", Model GFT42F manufactured by Lohmann & Stolterfoht, GMBH of Witten, West Germany, and consists of a variable displacement hydraulic motor 46 having operating ratios from 1 to 1 to 1 to 4, a hydraulically released friction brake 47 (see FIG. 2), and a triple planetary gear box 48 providing a further speed reduction over that of the motor 46. The use of such integrated drive assemblies at each wheel is more economical and more efficient than the use of a single hydraulic motor and gearbox centrally located on the tractor unit and driving the rear wheels of the latter through shafts, sprockets and chains, as in U.S. Pat. No. 3,453,939 previously referred to. The motor 46 is connected by lines 49 to a suitable hydraulic pump (not shown) carried on the tractor body 10. The drive assembly 45, which includes a mounting flange 50 drilled about at 51, is inserted as shown in FIG. 2 in the aperture 40 of the drive support bracket 35 and the flange 50 is bolted at 5 to the bracket cross plate 39 through the latter's mounting holes 42. The rotating housing 53 of the gearbox 48 is also provided with a mounting flange 54 drilled about at 55 to which the wheel 56 with its rubber tire are bolted at 57 through a spacer 58 (see FIG. 2).

Return now to FIG. 1 in which the essential components of the rear suspension assemblies 20, namely the brackets 21 and 35, the cylinders 27, piston rods 31, pistons 32 and wheels 56, are diagrammatically illustrated. (For simplicity's sake only one large cylinder 27 is shown in FIG. 1 for each rear suspension assembly 20 though in practice a pair of smaller ones are used, as shown in FIGS. 2-5, in order to save space and to increase the rigidity of each assembly 20. The function is identical regardless of the number of cylinders used.) The tractor unit also includes a motor driven, variable displacement, pressure compensated hydraulic pump P which draws fluid from a tank T through a line 60 and delivers it via line 61 to the middle of a three-position directional valve V operated by solenoids S1 and S2. From the valve V a line 62 leads to a line 63 interconnecting the lower chambers of the hydraulic cylinders 27 in the rear suspension assemblies 20. A line 64 in turn interconnects the upper chambers of the cylinders 27 and a line 65 connects the line 64 to the middle of the valve V from which a line 66 returns to the tank T. Assuming that the cylinders 27 and lines 62, 63, 64 and 65 are full of fluid, operation of the suspension assemblies 20 is as follows:

As the drive motors 46 propel the tractor unit, and should the right-hand bogie 12 encounter a bump, its pivot 13 and the right-hand side plate 11 will rise and accordingly so to a smaller extent will the cylinders 27 of the right-hand suspension assembly 20 since those cylinders 27 are in effect attached to the right-hand side plate 11 by the mounting bracket 21. Consequently their pistons 32 will expel fluid from the lower cylinder chambers through line 63 into the lower chambers of the left-hand cylinders 27 and the pistons 32 of the latter cylinders will in turn expel fluid from their upper chambers through line 64 to the upper chambers of the right-hand pistons 27. Since in effect the wheels 56 are connected to the piston rods 31 through the brackets 35, the right-hand wheel 56 will lower while the left-hand wheel will rise an equal amount relative to the body 11. Thus both wheels 56 will remain in firm contact with the ground, despite the tilt of the body 10, so the traction of the right-hand wheel will thereby be unimpaired. If the right-hand wheel 56 later encounters a bump, whether the same bump or another, it will rise and accordingly the pistons 32 of the right-hand cylinders 27 will also rise relative to the body 10, expelling fluid through line 64 into the upper chambers of the left-hand cylinders 27, whereupon the pistons 32 of the latter will lower the left-hand wheel 56, fluid from the left-hand cylinders 27 being expelled through line 63 into the lower chambers of the right-hand cylinders 27. Hence the body 10 will remain level despite the bump so that the position of the spreader screws 15 relative to the ground is undisturbed. Should the right-hand bogie 12 and/or wheel 56 encounter a depression, the latter wheel will lower and the left-hand wheel 56 rise in a similar manner as fluid is shuttled back and forth through lines 63 and 64 between the two pairs of cylinders 27. The reverse of all the foregoing occurs, of course, in the case of the left-hand bogie 12 and/or wheel 56 encountering a bump or depression. The effect in all instances, as previously noted, is a hydraulically accomplished "three-point" suspension, two of the points in this case being the front bogie pivots 13 and the remaining one being at the rear at a "point" midway between the wheels 56, just as though the wheels 56 were journaled on the ends of a transverse "walking" beam journaled in turn to the mid-point of the rear of the body 10.

If, for the reasons previously explained, it is desired to raise or lower the spreader screws 15 while on the run, the solenoid S1 or S2 and the pump P are activated. Activating solenoid S1 will supply fluid through lines 64 and 65 into the upper chambers of both pairs of cylinders 27 while removing it from their lower chambers through lines 62, 63 and 66, whence the rear of the body 10 and thus the spreader screws 15 will rise relative to the ground. Activating solenoid S2 instead of solenoid S1 will in a similar manner lower the rear of the body 10 and the spreader screws 15. Note that by raising the rear of the body 10 the maximum amount, i.e., when the pistons 32 "bottom" in the cylinders 27, the "3-point" suspension is "destroyed" and becomes in effect a rigid four-point suspension which is advantageous when loading and unloading a paver onto or from a flat bed truck. In a commercial embodiment of the invention in a rubber-tired paver, the total vertical "travel" of each wheel 56 relative to the body 11 is 4-½ inches, that is, 2-¼ inches up or down from the mid-points of the pistons 32 in the cylinders 27. Switches for the solenoids S1 and S2 and controls for the pump P may be located at the operator stations at the rear of the body 10.

Since hydraulic systems are subject to leakage, it is preferable to incorporate a device both to alert the paver operator should the rear of the body 10 lower during paving owing to leakage from the cylinders 27 and to automatically return the rear of the body 10 to the desired height. Such a device is well within the skill of the art to provide and one version of same is schematically illustrated in FIG. 1. An upright support 70 is secured at its lower end to the body 10 and slidably receives a vertical sleeve 71 at its upper end. To the upper end of the sleeve 71 in turn is attached a vertical rod 72 having a pair of vertically spaced switch actuators 73 above which are a scale 74 and a pointer 75, the latter being attached to the body 10. The arm 76 of a spring centered, DPDT switch SW1 is disposed between the actuators 73, the switch SW1 being connected in circuit with the solenoids S1 and S2 and the pump P and in addition to the switches at the operator stations. The location of the switch SW1 is vertically adjustable by means of a screw crank 77 operating in a bracket 78 fixed to the body 10. Between the sleeve 71 and the actuators 73 is pivoted the midpoint of a cross-bar 79 whose outer ends are connected to the upper ends of a pair of sheathed cables 80 secured at their lower ends to the upper piston rods 31. Now, should the rear of the body lo lower during paving owing to leakage from the hydraulic suspension system, the cables 80 will raise the sleeve 71, rod 72 and cross-bar 79 as a unit relative to the support 70 and the switch SW1. Consequently the lower actuator 73 will raise the switch arm 76 and energize solenoid S1 and the pump P, whereupon the rear of the body 10 will rise until the switch SW1 re-centers, thus automatically restoring the desired height of the rear of the body 10. The height of the latter can be adjusted, either initially or on the run, by the crank 77 which moves the switch SW1 up or down relative to the actuators 73. Lowering the switch SW1 will raise the body 10 in the manner just described whereas raising the switch SW1 will cause the upper actuator to lower the switch arm 76, thus energizing solenoid S2 and pump P and lowering the body 10 until the switch SW1 re-centers. In short, the height of the rear of the body 10 can be manually adjusted up or down by the crank 77, the amount of the adjustment being shown on the scale 74, as well as automatically maintained during paving in the event of suspension system leakage.

Though the invention has been described in terms of a particular embodiment, being the best mode known of carrying out the invention, it is not limited to that embodiment alone. As will be apparent, the invention can also be readily incorporated into a crawler-type tractor unit simply by replacing the rear drive wheels with drive sprockets and mounting the intermediate track bogies and the rear drive sprockets on side frames journaled at the front idler sprockets. The same "3-point" suspension will result as in the rubber-tired version and with all of the features and advantages of the latter. So the following claims are to be read as encompassing all adaptations and modifications of the invention falling within its spirit and scope.

I claim:

1. In a bituminous paver including a tractor unit with forward and rearward ends,
   (a) a hopper disposed at the forward end of the tractor unit for receiving paving material,
   (b) and material spreader means attached across the rearward end of the tractor unit for distributing paving material in opposite transverse directions,
   (c) the paver further including a floating screed assembly spaced rearwardly of the spreader means and extending transversely of the rearward end of the tractor unit,
   (d) first and second ground engaging suspension means for the tractor unit including respective first and second pairs of laterally spaced rotating assemblies,
   (e) first means attaching the first pair of rotating assemblies to the tractor unit adjacent its forward end such that upward and downward movement of either of the first pair of assemblies results in upward or downward movement of the forward end of the tractor unit,
   (f) the second pair of laterally spaced rotating assemblies being disposed adjacent the rearward end of the tractor unit and driven from the tractor unit for propelling the paver over the ground,
   the improvement comprising:
   (1) second means attaching the second pair of rotating assemblies to the tractor unit,
   (2) the second means including means interconnecting the second pair of rotating assemblies effective to provide a first mode of movement of the second pair or rotating assemblies relative to the tractor unit while on the run in which movement of one of said second pair in an upward direction effects corresponding movement of the other of said second pair in a downward direction,
   (3) whereby to maintain the second ground engaging suspension means in driving engagement with the ground while on the run regardless of the lateral disposition of paving material in the hopper.

2. The paver of claim I including third means operatively associated with the second attaching means to provide a second mode of movement of the second pair of rotating assemblies by effecting conjoint movement of the second pair of rotating assemblies by effecting conjoint movement of the second pair of rotating assemblies in an upward or a downward direction relative to the tractor unit on the run, whereby to respectively lower or raise the rearward end of the tractor unit and thus the material spreader means relative to the ground while on the run.

3. The paver of claim 36 wherein the second attaching means includes hydraulic means operatively associated with the second pair of rotating assemblies.

4. The paver of claim 3 wherein the hydraulic means includes a pair of hydraulic assemblies, each operatively associated with one of the second pair of rotating assemblies.

5. The paver of claim 4 wherein the pair of hydraulic assemblies are hydraulically interconnected effective to provide said first mode of movement.

6. The paver of claim 5 wherein the hydraulic assemblies include at least one pair of hydraulic cylinders, each cylinder having a piston, the cylinders and pistons being operatively associated with respective ones of the second pair of rotating assemblies; and including hydraulic conduit means interconnecting the hydraulic cylinders effective to provide said first mode of movement of the second pair of rotating assemblies.

7. The paver of claim 2 wherein the second attaching means includes hydraulic means operatively associated with the second pair of rotating assemblies.

8. The paver of claim 7 wherein the third means includes said hydraulic means.

9. The paver of claim 7 wherein the hydraulic means includes a pair of hydraulic assemblies, each operatively associated with one of the second pair of rotating assemblies.

10. The paver of claim 9 wherein the pair of hydraulic assemblies are hydraulically interconnected effective to provide said first mode of movement.

11. The paver of claim 10 wherein the third means includes said pair of hydraulic assemblies.

12. The paver of claim 11 wherein the third means further includes hydraulic pump and valve means hydraulically connected to said pair of hydraulic assemblies effective to provide said second mode of movement.

13. The paver of claim 10 wherein the hydraulic assemblies include at least one pair of hydraulic cylinders, each cylinder having a piston, the cylinders and pistons being operatively associated with respective ones of the second pair of rotating assemblies; and including hydraulic conduit, pump and valve means interconnecting the hydraulic cylinders effective to alternately provide said first or second mode of movement of the second pair of rotating assemblies.

14. The paver of claim 2 wherein the attaching means for each of the second pair of rotating assemblies includes a mounting bracket carrying a pair of upright hydraulic cylinders, each cylinder having an intermediate piston and piston rods extending from the piston through the upper and lower ends of the cylinder, and a support bracket attached to the upper and lower ends of the piston rods and vertically movable with the piston rods relative to the mounting bracket, one of the second pair of rotating assemblies being carried by the support bracket.

15. The paver of claim 14 wherein each cylinder and its piston normally define upper and lower chambers above and below the piston, and including first hydraulic conduit means interconnecting all the upper cylinder chambers and second hydraulic conduit means interconnecting all the lower cylinder chambers effective to provide said first mode of movement of the second pair of rotating assemblies.

16. The paver of claim 15 including third and fourth hydraulic conduit means connected respectively to the first and second hydraulic conduit means, and hydraulic fluid supply and control means effective when operative to supply hydraulic fluid to the upper cylinder chambers and remove the same from the lower cylinder chambers, or alternately to supply hydraulic fluid to the lower cylinder chambers and remove the same from the upper cylinder chambers, whereby to provide said second mode of movement of the second pair of rotating assembly and thereby to respectively raise or lower the rearward end of the tractor body relative to the ground.

17. The paver of claim 16 including means for automatically operating the hydraulic fluid supply and control means to supply hydraulic fluid to the upper cylinder chambers and remove the same from the lower cylinder chambers in the event of hydraulic leakage from the cylinders and consequent lowering of the rearward end of the tractor unit relative to the ground from a predetermined height, the automatic means terminating the operation of the hydraulic fluid supply and control means upon restoration of said predetermined height.

18. The paver of claim 14, 15, 16 or 17 including drive means carried by the support bracket for driving said one of the second pair of rotating assemblies.

19. The paver of claim 18 wherein the drive means includes a hydraulic motor.

20. The paver of claim 19 wherein the drive means also includes a brake and a gearbox.

21. In a bituminous paver having a tractor unit with front and rear ends
(a) a hopper disposed at the front end of the tractor unit for receiving paving material,
(b) and material spreader means attached across the rear end of the tractor unit for distributing paving material in opposite transverse directions,
(c) the paver further including a floating screed assembly spaced rearwardly of the spreader means and extending transversely of the rear end of the tractor unit,
(d) first and second ground engaging suspension means for the tractor unit,
(e) The first and second suspension means including respective front and rear pairs of elastomeric tired, rotating wheel assemblies,
(f) first means attaching the front pair of wheel assemblies to the tractor unit adjacent its front end such that upward or downward movement of either of the front wheel assemblies results in upward or downward movement of the front end of the tractor unit,
(g) the rear pair of wheel assemblies being disposed adjacent the rear end of the tractor unit and driven from the tractor unit for propelling the paver over the ground,
the improvement comprising:
(1) second means attaching the rear pair of wheel assemblies to the tractor unit,
(2) the second means including hydraulic means adjacent each rear wheel assembly and interconnected by hydraulic conduit means such that upward movement of one of the rear wheel assemblies while on the run automatically causes corresponding downward movement of the other of the rear wheel assemblies,
(3) whereby to maintain each rear wheel assembly in driving engagement with the ground while on the run regardless of the lateral disposition of paving material in the hopper.

22. The paver of claim 21 wherein the hydraulic means and said interconnection thereof alternately permit conjoint upward or downward movement of both rear wheel assemblies relative to the tractor unit while on the run, whereby the rear end of the tractor unit and thus the material spreader means can be respectively lowered or raised relative to the ground while on the run, and including hydraulic fluid supply and control means for supplying fluid to and from the hydraulic means effective to provide said alternate movement.

23. The tractor unit of claim 22 wherein the hydraulic means for each rear wheel assembly includes at least one hydraulic cylinder having a piston, one of the cylinder and the piston being operatively associated with the rear wheel assembly and the other of the cylinder and the piston being operatively associated with the tractor unit.

24. The tractor unit of claim 23 wherein each cylinder includes a pair of piston rods extending from the piston through each end of the cylinder, the piston and cylinder normally defining a pair of first and second chambers on the opposite sides of the piston, wherein the hydraulic conduit means interconnect the first chambers and separately interconnect the second chambers of all the cylinders, and wherein the hydraulic fluid supply and control means supply fluid to all the first chambers and remove it from the second chambers, or alternately supply fluid to all the second chambers and remove it from all the first chambers.

25. The tractor unit of claim 24 including means for automatically operating the hydraulic fluid supply and control means to supply hydraulic fluid to the upper cylinder chambers and remove the same from the lower cylinder chambers in the event of hydraulic leakage from the cylinders and consequent lowering of the rear end of the tractor body relative to the ground from a predetermined height, the automatic means terminating operation of the hydraulic fluid supply and control means upon restoration of said predetermined height.

26. The tractor unit of claim 21, 22, 23, 24 or 25 including drive means for each rotating assembly, the drive means being carried by the mounting means and including a hydraulic motor, a brake and a gearbox.

27. A suspension assembly for the rear end of the tractor unit of a bituminous paver of the floating screed type, the assembly comprising:
(1) first mounting means for mounting the assembly to the tractor unit;
(2) second mounting means carried by the first mounting means,
(3) the first and second mounting means being interconnected through at least one hydraulic cylinder effective for movement of the second mounting means relative to the first mounting means upon ingress to and egress from the cylinder of hydraulic fluid,
(4) the cylinder including a piston and a pair of piston rods extending from opposite sides of the piston through the ends of the cylinder,
(5) the first mounting means being secured to one of the cylinders and the piston rods and the second mounting means being secured to the other of the cylinder and the piston rods effective to provide said relative movement;
(6) an rotating means carried by the second mounting means.

28. The assembly of claim 27 wherein the rotating means includes means for driving rotation thereof.

29. The assembly of claim 28 wherein the driving means further includes a motor carried by the second mounting means.

30. The assembly of claim 29 wherein the motor is a hydraulic motor and the drive means further includes a brake and a gearbox carried by the second mounting means and integral with the motor.

* * * * *